(12) United States Patent
Kim et al.

(10) Patent No.: US 8,731,480 B2
(45) Date of Patent: May 20, 2014

(54) METHOD FOR TRANSMITTING AND RECEIVING DATA IN A COOPERATIVE MULTIPLE-INPUT MULTIPLE-OUTPUT MOBILE COMMUNICATION SYSTEM

(75) Inventors: Jae Wan Kim, Seoul (KR); Su Nam Kim, Seoul (KR); Dong Guk Lim, Inchen-si (KR); Bin Chul Ihm, Anyang-si (KR); Ja Ho Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 276 days.

(21) Appl. No.: 12/922,819

(22) PCT Filed: May 7, 2009

(86) PCT No.: PCT/KR2009/002384
§ 371 (c)(1),
(2), (4) Date: Sep. 15, 2010

(87) PCT Pub. No.: WO2009/136736
PCT Pub. Date: Nov. 12, 2009

(65) Prior Publication Data
US 2011/0038436 A1    Feb. 17, 2011

Related U.S. Application Data

(60) Provisional application No. 61/051,012, filed on May 7, 2008.

(30) Foreign Application Priority Data

Aug. 26, 2008    (KR) .................... 10-2008-0083388

(51) Int. Cl.
*H04B 7/00*    (2006.01)
(52) U.S. Cl.
USPC .......................... 455/69; 375/267; 370/238

(58) Field of Classification Search
None
See application file for complete search history.

(56) References Cited

U.S. PATENT DOCUMENTS

| | | | |
|---|---|---|---|
| 2001/0048694 A1* | 12/2001 | Banister | 370/537 |
| 2006/0120477 A1* | 6/2006 | Shen et al. | 375/267 |
| 2007/0211813 A1 | 9/2007 | Talwar et al. | |
| 2007/0280116 A1 | 12/2007 | Wang et al. | |
| 2008/0247488 A1* | 10/2008 | Li et al. | 375/299 |
| 2009/0135944 A1* | 5/2009 | Dyer et al. | 375/267 |
| 2009/0185492 A1* | 7/2009 | Senarath et al. | 370/238 |
| 2009/0274077 A1* | 11/2009 | Meylan et al. | 370/280 |
| 2009/0274109 A1* | 11/2009 | Zhang et al. | 370/329 |

FOREIGN PATENT DOCUMENTS

| | | |
|---|---|---|
| CN | 1973459 A | 5/2007 |
| CN | 101095296 A | 12/2007 |
| CN | 101116300 | 1/2008 |
| CN | 101123594 A | 2/2008 |
| CN | 101136718 | 3/2008 |
| CN | 101146078 | 3/2008 |
| CN | 101159462 | 4/2008 |
| KR | 10-2005-0020576 | 3/2005 |
| KR | 10-2006-0096360 | 9/2006 |
| WO | WO 02-15613 A1 | 2/2002 |

* cited by examiner

*Primary Examiner* — Fayyaz Alam
*Assistant Examiner* — Mohammed Rachedine
(74) *Attorney, Agent, or Firm* — McKenna Long & Aldridge LLP

(57) ABSTRACT

A method for transmitting and receiving data in a cooperative Multiple-Input Multiple-Output (MIMO) mobile communication system is disclosed. The method includes selecting a transmission path for transmitting precoding-related feedback control information to one or more cooperative base stations operating in the cooperative MIMO mode, and transmitting the precoding-related feedback control information to the one or more cooperative base stations through the selected transmission path.

4 Claims, 9 Drawing Sheets

METHOD FOR TRANSMITTING AND RECEIVING DATA IN A COOPERATIVE MULTIPLE-INPUT MULTIPLE-OUTPUT MOBILE COMMUNICATION SYSTEM

This application claims the benefit of U.S. Provisional Application No. 61/051,012 filed on May 7, 2008, Korean Patent Application No. 10-2008-0083388 filed on Aug. 26, 2008 and PCT Application No. PCT/KR2009/002384 filed on May 7, 2009, all of which are incorporated by reference in their entirety herein.

TECHNICAL FIELD

The present invention relates to a method for transmitting and receiving data in a Multiple-Input Multiple-Output (MIMO) mobile communication system, and more particularly, to a method for transmitting and receiving data including feedback control information in a MIMO mobile communication system.

BACKGROUND ART

MIMO has recently attracted much attention as a broadband wireless mobile communication technology. Especially MIMO increases spectral efficiency in proportion to the number of antennas, compared to Single-Input Single-Output (SISO) with which the spectral efficiency is difficult to achieve.

MIMO is a multiple antenna technology aiming at high-data rate communications by use of a plurality of antennas. MIMO schemes may be classified into MIMO spatial multiplexing and MIMO spatial diversity according to whether the same or different data are transmitted.

MIMO spatial multiplexing scheme is a transmission scheme in which different data are simultaneously transmitted through a plurality of transmit/receive antennas. That is, a transmitter transmits different data through different transmit antennas and a receiver distinguishes the transmitted data by appropriate interference cancellation and signal processing. Therefore, data rate is increased as much as the number of the transmit antennas.

MIMO spatial diversity scheme achieves transmit diversity by transmitting the same data through a plurality of transmit antennas. That is, spatial diversity is a kind of space-time channel coding. Spatial diversity may maximize a transmit diversity gain (a performance gain) by transmitting the same data through a plurality of transmit antennas. Yet, spatial diversity scheme is a technology for increasing transmission reliability with a diversity gain rather than a technology for increasing data rate.

The MIMO technology may also be categorized into open-loop MIMO and closed-loop MIMO depending on whether the receiver feeds back radio channel information to the transmitter. In the open-loop MIMO scheme, the transmitter transmits different data through a plurality of transmit antennas at a high data rate, if it estimates current radio channels to be available for MIMO spatial multiplexing based on whatever little available information without perfect knowledge of the statuses of the radio channels. If the transmitter estimates the current radio channels to be unavailable for MIMO spatial multiplexing, it uses the plurality of transmit antennas for diversity, thereby increasing transmission reliability.

On the other hand, the closed-loop MIMO scheme increases MIMO efficiency by allowing the receiver to transmit appropriate feedback information about radio channels to the transmitter. Specifically, the transmitter increases MIMO efficiency by performing antenna grouping, antenna selection, and precoding for a plurality of antennas based on the feedback information.

Meanwhile, a cooperative MIMO mode is defined to provide multiple antenna service to a receiver such as a Mobile Station (MS) located at a cell boundary through Base Stations (BSs) of multiple cells under a multi-cell environment. The cooperative MIMO mode replies on the idea that better performance is achieved with lower correlations among the characteristic values of channels established among a plurality of antennas. In other words, the cooperative MIMO mode utilizes the fact that as transmit antennas are spaced farther from each other and as receive antennas are spaced farther from each other, more favorable channel characteristics for spatial multiplexing are achieved.

FIG. 1 conceptually illustrates a conventional cooperative MIMO operation in a multi-cell environment. Referring to FIG. 1, a first MS (MS 1) receives a communication service from a first BS (BS 1) being its serving BS. Second and third MSs (MS 2 and MS 3) also receive communication services from their serving BSs, BS 2 and BS 3, respectively. MS 1, MS 2 and MS 3 are located at the boundaries of cells managed by their serving BSs, BS 1, BS 2 and BS 3. This means that MS 1, MS 2 and MS 3 receive interference signals from other BSs as well as signals from their serving BSs.

The cooperative MIMO mode enables such a user terminal as is located at a cell boundary and thus vulnerable to interference from neighbor cells to receive the same signal transmitted by its serving BS from the BSs of the neighbor cells, using the antennas of the neighbor cells as MIMO transmit antennas. In this manner, MIMO spatial diversity or MIMO spatial multiplexing are effected.

FIG. 2 illustrates a conventional cooperative MIMO mode in a closed-loop MIMO scheme using codebook-based precoding. As is known, a transmitter (e.g. a BS) using the precoding-based closed-loop MIMO scheme performs precoding prior to transmission of transmission data through antennas. The precoding involves multiplying the transmission data to be transmitted through the transmit antennas by a predetermined weight matrix according to a radio channel status estimated based on feedback information about the radio channel status (e.g. a Channel Quality Indicator (CQI)) received from a receiver in order to compensate for signal distortion that occurs during transmission of the data on radio channels. It is not ideal to represent all radio channel statuses with the feedback radio channel information from the receiver (i.e. radio channel information in FIG. 2) because the feedback information is too huge in amount.

In this context, both the transmitter and the receiver define a predetermined number of radio channel statuses, label them with indexes, and share the index information. This is called a codebook scheme. Then the receiver notifies the transmitter of the index of a radio channel status most approximate to a current radio channel status. The transmitter generates an appropriate weight matrix for the transmit antennas based on the received index and multiplies transmission data by the weight matrix. The precoding scheme using the indexes of a finite number of radio channel statuses is referred to as codebook-based precoding.

Referring to FIG. 2, M BSs 210-1 to 210-M (BS 1 to BS M) estimate information H1, H2, . . . , HM about radio channels established between BS 1 to BS M and k MSs 220-1 to 220-k (MS 1 to MS k) and independently generate weight matrices W1, W2, . . . , WM each having antenna weights based on the estimated radio channel information. Each of BS 1 to BS M transmits a plurality of independent data streams to a plurality of MSs or a particular MS after precoding the data streams in its precoder 230-1, ..., or 230-M.

Hn denotes radio channel information between an nth BS and one or more MSs communicating with the nth BS. That is, Hn represents radio channels between the nth BS and one or more MSs serviced by the nth BS, on the assumption that the nth BS may be a serving BS or a cooperative BS operating in the cooperative MIMO mode for the one or more MSs. In the illustrated case of FIG. 2, since the cooperative MIMO operation is performed using codebook-based precoding, a BS detects radio channel statuses referring to indexes indicated by feedback information (radio channel information in FIG. 2) received from one or more MSs.

A scheduler 250 transmits control information indicating BSs through which data are to be transmitted and an MS to receive the data according to feedback information representing radio channel statuses and cooperative MIMO request information of MSs and BSs that are received through a backbone 200. A user data distributor 260 determines a transmission path to transmit data to a particular mobile station or a plurality of mobile stations through one or more BSs in the cooperative MIMO mode.

As described above, when the precoding-based closed-loop cooperative MIMO scheme is implemented, transmission of Preferred precoding codebook Matrix Indexes (PMIs) to BSs may degrade cooperative MIMO performance due to inter-cell interference and channel changes.

DISCLOSURE OF INVENTION

Technical Problem

An object of the present invention devised to solve the problem lies on a method for transmitting and receiving data to reduce a data transmission delay in a mobile communication system.

Another object of the present invention devised to solve the problem lies on a method for transmitting and receiving a feedback control command to improve performance in a cooperative MIMO mobile communication system.

Technical Solution

The object of the present invention can be achieved by providing a method for transmitting feedback control information in a mobile station in a wireless communication system using a cooperative Multiple-Input Multiple-Output (MIMO) mode, which includes selecting a transmission path for transmitting precoding-related feedback control information to one or more cooperative base stations operating in the cooperative MIMO mode, and transmitting the precoding-related feedback control information to the one or more cooperative base stations through the selected transmission path.

In another aspect of the present invention, provided herein is a method for receiving feedback control information in a cooperative base station in a wireless communication system using a cooperative Multiple-Input Multiple-Output (MIMO) mode, which includes receiving precoding-related feedback control information from one or more mobile stations through a transmission path, and receiving a cooperative MIMO mode request message from the one or more mobile stations.

The precoding-related feedback control information may include at least one of a cell Identifier (ID), an allowed frequency band, a modulation scheme, a coding scheme, precoding codebook matrix index information, and restricted precoding codebook matrix index information of the cooperative base station.

The transmission path may be at least one of a path running from the one or more mobile stations to the cooperative base station through a serving base station over a backbone, a direct path running from the one or more mobile stations to the cooperative base station, and a path running from the one or more mobile stations to the cooperative base station through a relay station.

The transmission path may be selected according to at least one of delay-sensitiveness of the precoding-related feedback control information, the presence or absence of a relay station, and whether the cooperative base station allocates a feedback channel to the one or more mobile stations.

Advantageous Effects

Exemplary embodiments of the present invention have the following effects.

Firstly, data transmission and reception are carried out with a short transmission delay in a MIMO mobile communication system.

Secondly, system efficiency is increased by transmitting and receiving a feedback control command in various manners according to a system situation in a cooperative MIMO mobile communication system.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings.

Exemplary embodiments of the present invention which will be described below are applicable to a multi-carrier multiple access system taking into account the mobility of MSs, for example, an Orthogonal Frequency Division Multiplexing (OFDM) communication system. The exemplary embodiments of the present invention are also applicable to systems conforming to Institute of Electrical and Electronics Engineers (IEEE) 802.16e and IEEE 802.16m that are standards for OFDM (refer to IEEEStd 802.16e-2005 and http://www.ieee802.org/16/published.html.) Also, the exemplary embodiments of the present invention is applicable to other similar mobile communication systems such as Evolved-Universal Mobile Telecommunications System (E-UMTS) called Long Term Evolution (LTE). Further, the present invention may be used for a variety of communication systems including a single-antenna system and a multiple-antenna system.

In general, a communication system is deployed over a wide area to provide various communication services including voice transmission, packet data transmission, etc. The communication services are available on a downlink and an uplink. The downlink refers to communications from a BS to an MS and the uplink refers to communications from an MS to a BS. A BS is usually a fixed point that communicates with MSs, covering a network except for MSs in a communication system including an upper layer as well as a physical transmitter. Therefore, the terms "network" and "BS" have the same meaning in contrast to the term "MS". An MS may be stationary or mobile.

Figure 1:
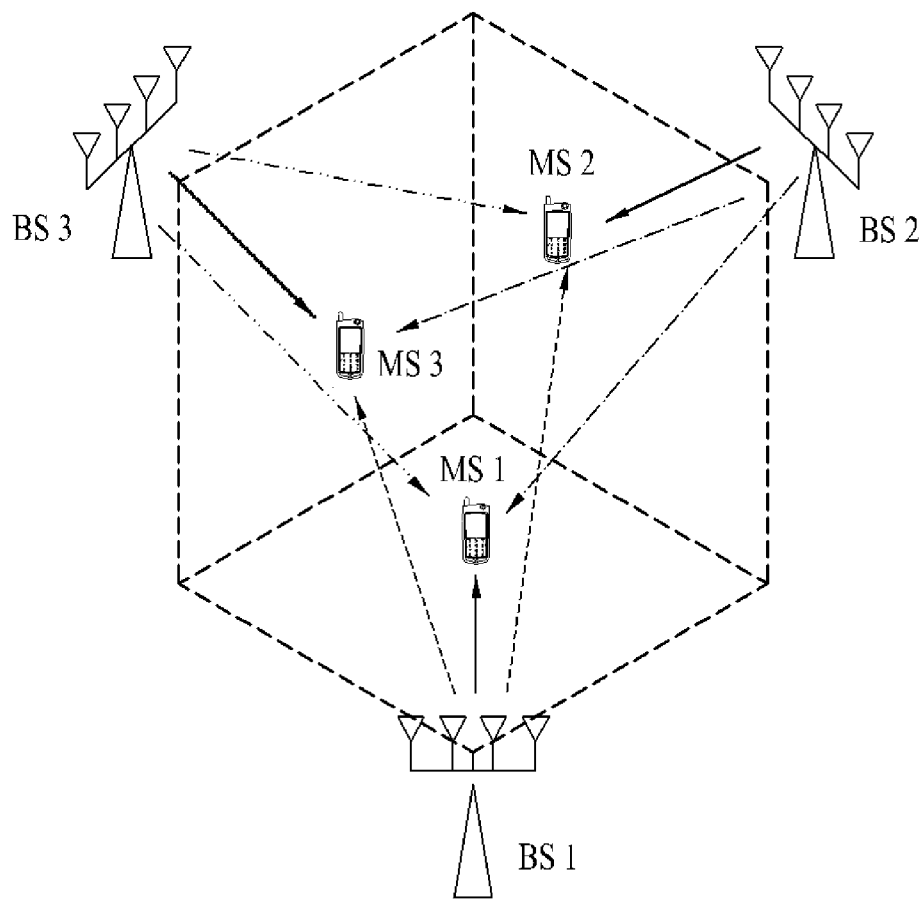
FIG. 1 conceptually illustrates a conventional cooperative MIMO operation in a multi-cell environment.
Figure 2:
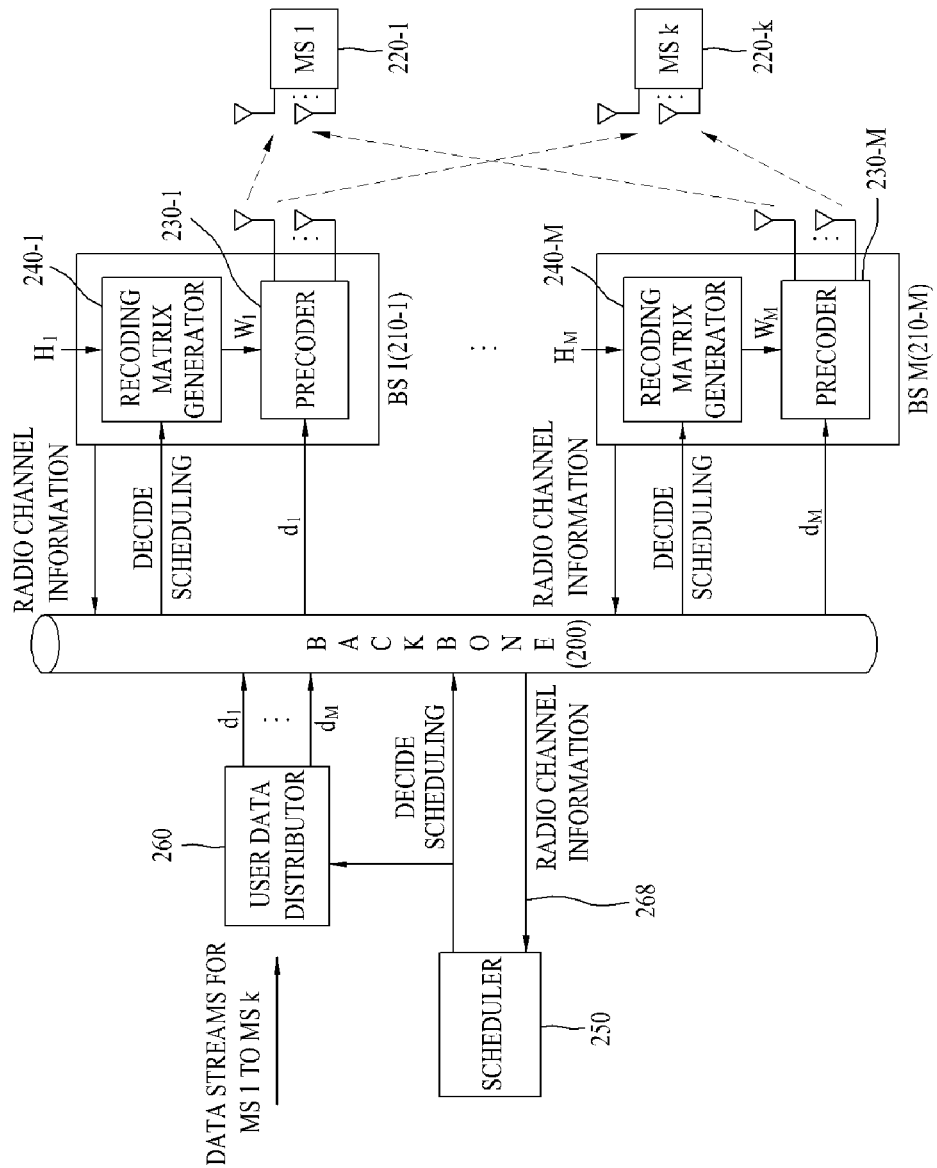
FIG. 2 illustrates a conventional cooperative MIMO mode in a closed-loop MIMO scheme using codebook-based precoding.
Figure 3:
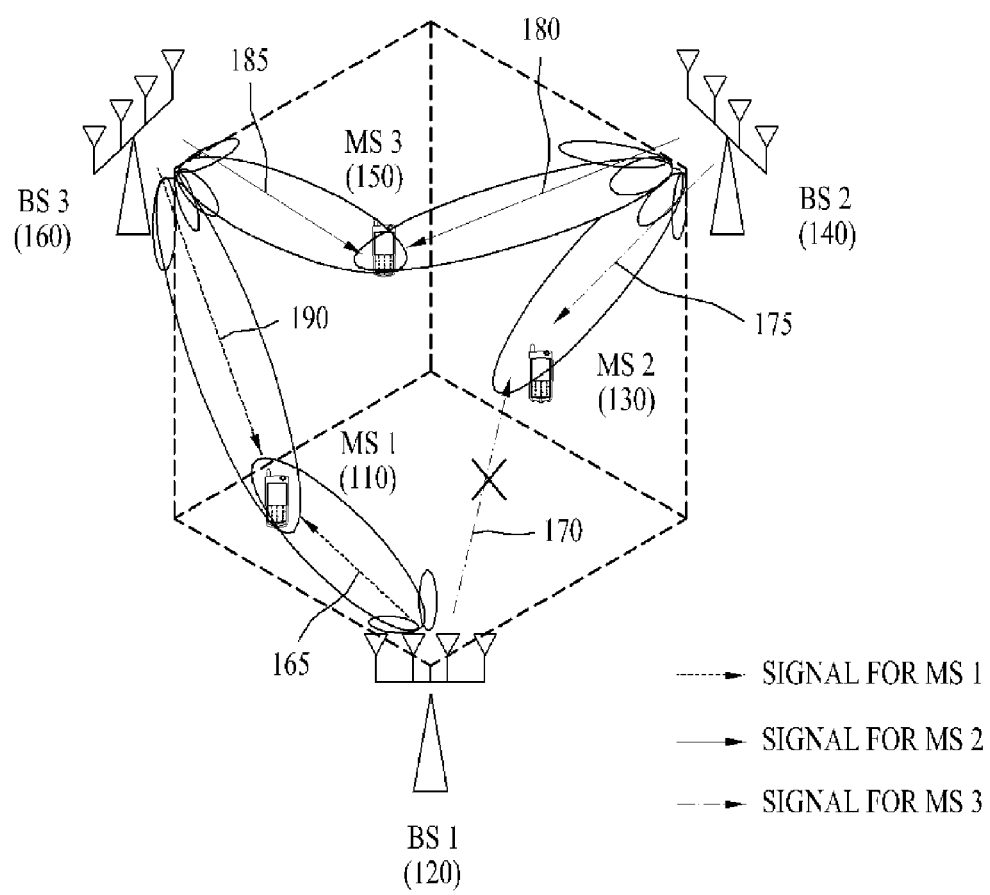
FIG. 3 illustrates a cooperative MIMO operation according an exemplary embodiment of the present invention.

FIG. 3 illustrates a cooperative MIMO operation according an exemplary embodiment of the present invention. Referring to FIG. 3, MSs and BSs operate in a cooperative MIMO mode using a precoding-based closed-loop scheme (hereinafter, referred to as precoding-based cooperative MIMO mode). In the cooperative MIMO mode illustrated in FIG. 3, when the correlation between channels is large, BSs may use the same codebook (especially, the Discrete Fourier Transform (DFT) codebook) through beamforming. When the correlation is small, the BSs may use different codebooks. The exemplary embodiment illustrated in FIG. 3 and other exemplary embodiments described later are based on the assumption that a serving BS and cooperative BSs use the same codebook. However, the exemplary embodiments of the present invention are also applied to the case where BSs use different codebooks.

A first MS 110 (MS 1) at the boundary of a cell managed by a first BS 120 (BS 1) operates in the cooperative MIMO mode to receive signals from its serving BS 120 and a neighbor BS 160, i.e. a third BS 160 (BS 3), for spatial diversity or spatial multiplexing. Thus, MS 1 may increase the Signal-to-Noise Ratio (SNR) of received specific signals or channels 165 and 190 to satisfy a predetermined Quality of Service (QoS) for the signals or channels 165 and 190. To this end, MS 1 transmits codebook indexes as feedback control information to BS 1 and BS 3.

Meanwhile, a second MS 130 (MS 2) at the boundary between the cells of a first BS 130 (BS 1) and a second BS 140 (BS 2) need to receive a signal or channel 175 from its serving BS, i.e. BS 2 and intends to avoid reception of a signal or channel 170 from its neighbor BS, BS 1 in order to reduce Inter-Cell Interference (ICI), instead of the cooperative MIMO mode service due to a system situation or the status of MS 2. For this purpose, MS 2 may transmit feedback control information such that the cooperative BS 120, i.e. BS 1 does not use a specific index in its codebook.

A third MS 150 (MS 3) that also receives a signal from BS 2 despite its location at the boundary of a cell managed by BS 3 may achieve spatial diversity with a high SNR by receiving the same signal or channel from its serving BS 160 and its neighbor BS 140, i.e. BS 2. Since antenna beams generated in BS 3 based on feedback control information about precoding codebook indexes received from MS 1 and MS 3 are maintained orthogonal in view of the unitary characteristic of a precoding codebook, spatial multiplexing may be realized with minimal inter-antenna beam interference.

As described above, an MS operating in the precoding-based cooperative MIMO mode transmits feedback control information including a PMI suitable for the radio channel status between the MS and its cooperative BS to the cooperative BS as well as feedback control information including a PMI to a serving BS. A method for transmitting feedback control information including a PMI to a cooperative BS in an MS will be described below according to exemplary embodiments of the present invention.

Figure 4:
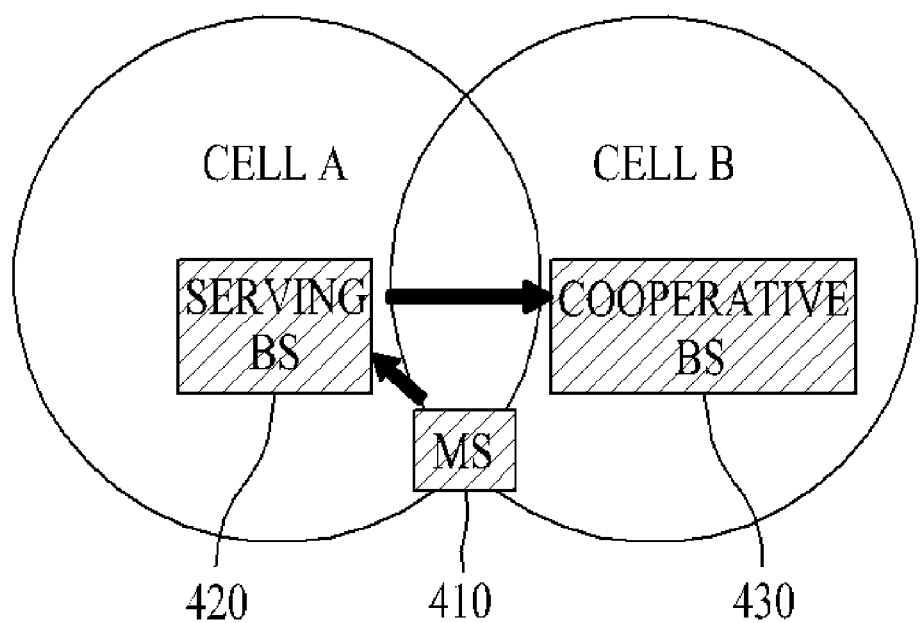
FIG. 4 illustrates a method for transmitting feedback control information in an MS according an exemplary embodiment of the present invention.

FIG. 4 illustrates a method for transmitting feedback control information in an MS according to an exemplary embodiment of the present invention. The exemplary embodiment illustrated in FIG. 4 is about a cooperative MIMO mode in a codebook-based precoding closed-loop MIMO scheme, like the exemplary embodiment illustrated in FIG. 3.

Referring to FIG. 4, an MS 410 located in the overlap area between cell A under management of a serving BS 420 and cell B under management of a cooperative BS 430 may transmit feedback control information including a PMI to the cooperative BS 430 through the serving BS 420. To be more specific, the feedback control information may be transmitted from the serving BS 420 to the cooperative BS 430 through a backbone (not shown). Now a detailed description will be made of a signaling flow between the MS and the BSs illustrated in FIG. 4 according to an exemplary embodiment of the present invention.

Figure 5:
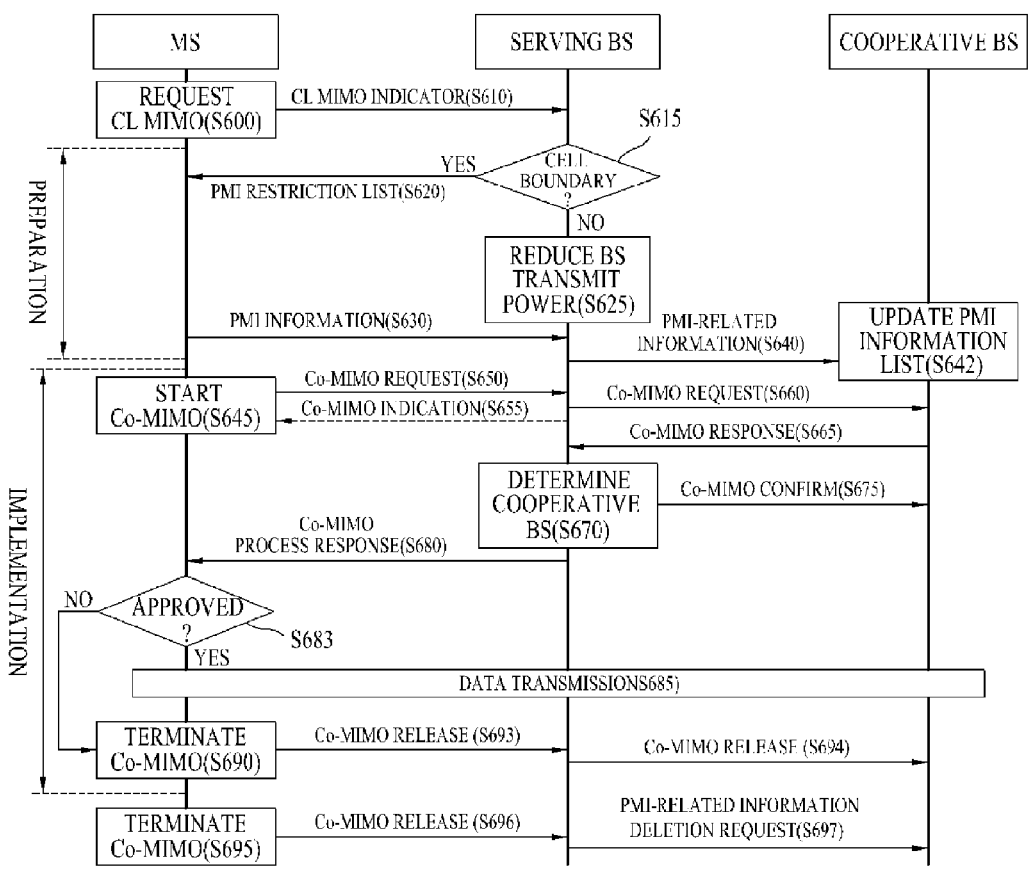
FIG. 5 is a diagram illustrating a signal flow for a closed-loop cooperative MIMO operation according to an exemplary embodiment of the present invention.

FIG. 5 is a diagram illustrating a signal flow for a closed-loop cooperative MIMO operation according to an exemplary embodiment of the present invention. The exemplary embodiment illustrated in FIG. 5 is about the cooperative MIMO mode in the codebook-based precoding closed-loop MIMO scheme, especially a case of PMI restriction.

PMI restriction refers to restriction of PMIs in a neighbor BS. That is, among MSs serviced by the neighbor BS, only predetermined PMIs are available to MSs inside the cell of the neighbor BS, not MSs at a cell boundary. On the other hand, all PMIs are available to the MSs at the cell boundary without PMI restriction. Thus a maximal beamforming gain may be achieved. As a consequence, the throughput of the entire cell is increased, while the throughput of the MSs inside the cell is decreased. The resulting reduction of ICI improves the cooperative MIMO performance of the MSs at the cell boundary.

In following exemplary embodiments of the present invention, the cooperative MIMO mode operation involves a preparation stage for the cooperative MIMO mode, in which information about restricted PMIs are shared between an MS and a cooperative BS for ICI reduction and an implementation stage in which the cooperative MIMO mode is actually implemented using parameters determined between the MS and the cooperative BS during the preparation stage. In the preparation stage, an MS, a serving BS, and a neighbor BS share parameters required for implementation of the cooperative MIMO mode (e.g. PMI information and, when needed, PMI restriction information).

The MS may be stationary or mobile. Thus, the parameters need to be updated according to the current status of the MS. The update may take place periodically, or upon request of update from the MS or a BS when the MS satisfies a predetermined condition, which will be described below in detail.

Referring to FIG. 5, the MS receives reference signals such as pilot signals from the current serving BS and neighbor BSs that could be cooperative BSs later, estimates current radio channel statuses with respect to the BSs and detects its location in a cell, using the reference signals, and determines to transition to the cooperative MIMO mode according to the current radio channel statuses and the current location in the cell in step S600. In step S610, the MS then transmits control information requesting the cooperative MIMO mode, i.e. a CL MIMO indicator to the serving BS.

In step S615, the serving BS determines whether the MS is located at the boundary of the cell. If determining that the MS is at the cell boundary, the serving BS transmits PMI information including PMI restriction lists for respective frequency bands allocated to the serving BS to the MS in order to reduce ICI through PMI restriction in step S620. On the other hand, if determining that the MS is not at the cell boundary, the serving BS can restrict transmit power directed to the MS in step S625.

The MS determines radio channel statuses from reference signals received from neighbor BSs and transmits feedback control information including PMI restriction information that minimizes ICI from the neighbor BSs and information about cell Identifiers (IDs), frequency bands, and channel qualities of the neighbor BSs to the serving BS in step S630.

In step S640, the serving BS transmits PMI-related information including PMI restriction information, as feedback control information to the neighbor BSs over a backbone based on the feedback control information received in step S630. The neighbor BSs update their PMI lists so as to perform the cooperative MIMO mode within the PMI lists in step S642.

The preparation stage for sharing cooperative MIMO parameters, which involves ICI reduction by PMI restriction, is followed by the stage of implementing the cooperative MIMO mode between the MS and a neighbor BS to act as a cooperative BS in step S645. The MS transmits a control message requesting implementation of the cooperative MIMO mode, that is, a Co-MIMO request message to the serving BS in step S650 or receives a Co-MIMO indication message requesting or commanding implementation of the cooperative MIMO mode from the serving BS in step S655. The serving BS transmits the Co-MIMO request message to the neighbor BS promising as a cooperative BS over the backbone. The neighbor BS transmits a Co-MIMO response message indicating approval of the Co-MIMO request to the serving BS over the backbone in step S665.

The serving BS determines from the Co-MIMO response message whether the neighbor BS is to be a cooperative BS in step S670 and replies to the neighbor BS with a Co-MIMO confirm message so that the neighbor BS will act as the cooperative BS in step S675. The serving BS transmits a Co-MIMO processing response message indicating the neighbor BS to act as the cooperative BS to the MS in step S680. The Co-MIMO processing response message includes the cell ID of the neighbor BS and information indicating whether the neighbor BS will perform the cooperative MIMO mode. Or the Co-MIMO processing response message may include only the cell ID of the cooperative BS to perform the cooperative MIMO mode. The MS determines whether to perform the cooperative MIMO mode with the neighbor BS determined as the cooperative BS, taking into account the power status, resource status, etc. of the MS in step S683. If the MS determines to perform the cooperative MIMO mode with the neighbor BS, it receives data from the serving BS and the cooperative BS, thereby achieving spatial diversity or spatial multiplexing effects in step S685. However, if the MS determines not to perform the cooperative MIMO mode with the neighbor BS, it retransmits the Co-MIMO request message to the serving BS or terminates the procedure without performing the cooperative MIMO mode in step S690.

When the MS wants to terminate the on-going cooperative MIMO mode in step S685, it transmits a Co-MIMO release message to the serving BS in step S693. The serving BS transmits the Co-MIMO release message to the cooperative BS over the backbone in step S694.

If the MS wants to terminate the closed-loop MIMO scheme in step S695, it transmits a CL MIMO release message to the serving BS in step S696. Then the serving BS transmits a PMI-related information deletion request message to the cooperative BS, requesting deletion of the PMI-related information about the MS, so that the cooperative BS may not perform a PMI restriction-related operation regarding the MS in step S697.

While signaling is carried out in the context of a single cooperative BS in the illustrated case of FIG. 5, the same signaling flow may apply to the case where the MS is located at the boundary between two or more neighbor BSs such that the MS receives the cooperative MIMO mode service from neighbor BSs operable as cooperative BSs. Also, the exemplary embodiment of the present invention described in FIG. 5 may be implemented without PMI restriction.

Figure 6:
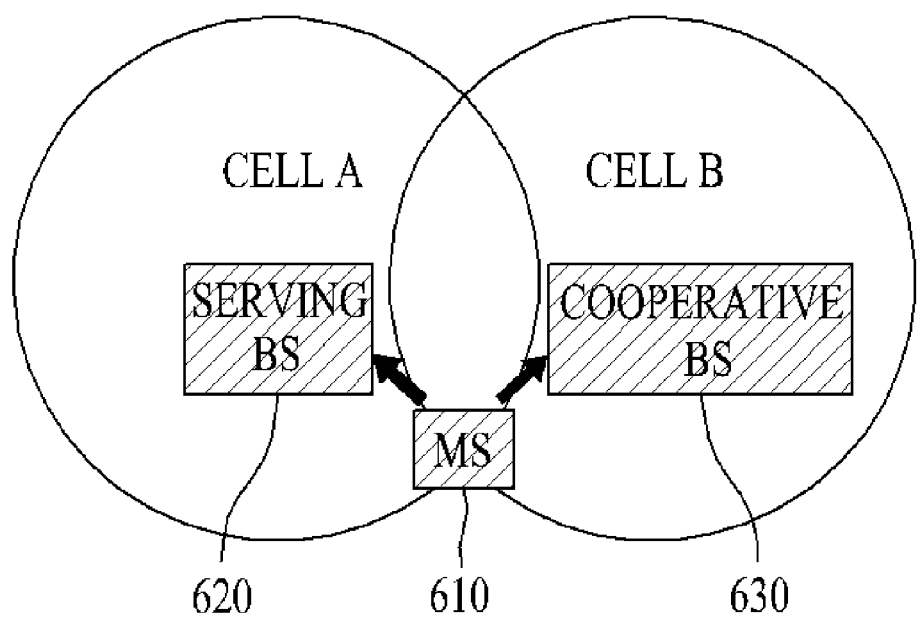
FIG. 6 illustrates a method for transmitting feedback control information in an MS according another exemplary embodiment of the present invention.

FIG. 6 illustrates a method for transmitting feedback control information in an MS according to another exemplary embodiment of the present invention. Like the exemplary embodiment illustrated in FIG. 3, the exemplary embodiment illustrated in FIG. 6 is also about the cooperative MIMO mode in the codebook precoding-based closed-loop MIMO scheme.

Referring to FIG. 6, an MS 610 located in the overlap area between cell A managed by a serving BS 620 and cell B managed by a cooperative BS 630 may transmit feedback control information including a PMI for the cooperative BS 630 directly to the cooperative BS 630. To be more specific, a feedback channel that the cooperative BS 630 has allocated to the MS 610 carries the feedback control information to the cooperative BS 630. The feedback channel may be a fast feedback dedicated channel, for example. The fast feedback dedicated channel is used to carry feedback information such as a CQI (Channel Quality Indicator) from an MS. Since the fast feedback dedicated channel is sharable among MSs, each MS that wants to use the channel may transmit the fast feedback dedicated channel to a BS using an orthogonal code (e.g. a Walsh code) specific to the BS that has allocated the fast feedback dedicated channel.

The exemplary embodiment illustrated in FIG. 6 may be performed in conjunction with the exemplary embodiment illustrated in FIG. 4. That is, delay-sensitive feedback control information directed to the cooperative BS may be transmitted directly to the cooperative BS over the fast feedback dedicated channel, whereas relatively delay-insensitive feedback control information may be transmitted to the cooperative BS through the serving BS 620 over a backbone.

As stated before, the feedback control information may include PMI information, allowed frequency band information, a cell ID, channel quality information, a Modulation and Coding Scheme (MCS) level, modulation scheme information, etc.

Now a detailed description will be made of a signaling flow between the MS and the BSs illustrated in FIG. 6 according to an exemplary embodiment of the present invention.

Figure 7:
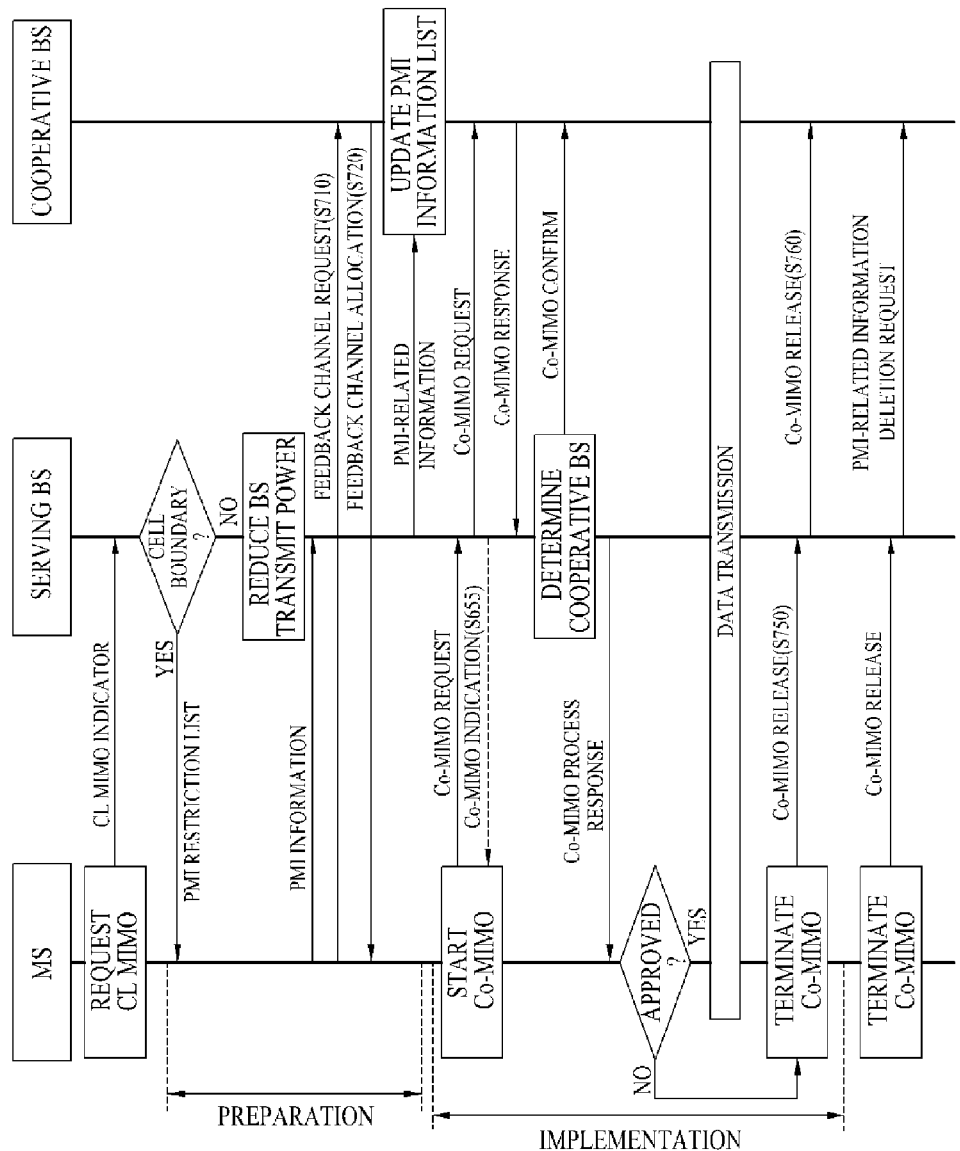
FIG. 7 is a diagram illustrating a signal flow for a closed-loop cooperative MIMO operation according to another exemplary embodiment of the present invention.

FIG. 7 is a diagram illustrating a signal flow for a closed-loop cooperative MIMO operation according to another exemplary embodiment of the present invention. The exemplary embodiment illustrated in FIG. 7 is also about the cooperative MIMO mode in the codebook-based precoding closed-loop MIMO scheme, especially a case of PMI restriction. The signaling flow is identical to that illustrated in FIG. 5 on the whole, except that the feedback control information is transmitted directly to a neighbor BS rather than through a serving BS over a backbone. As described before with reference to FIG. 6, the feedback control information is transmitted through a feedback channel (e.g. a fast feedback dedicated channel) allocated by a neighbor BS that may act as a cooperative BS. Compared to the exemplary embodiment illustrated in FIG. 5, feedback channel allocation from the cooperative BS (steps S710 and S720) are added to the preparation stage and release of an allocated feedback channel when the cooperative MIMO mode is terminated is required for the cooperative MIMO mode implementation stage. The feedback channel may be released in steps S750 and S760 corresponding to steps S693 and S694 of FIG. 5, or by exchanging a release request message and a release confirm message directly between the MS and the cooperative BS.

While signaling is carried out in the context of a single cooperative BS in the illustrated case of FIG. 7, the same signaling flow may apply to the case where the MS is located at the boundary between two or more neighbor BSs such that the MS receives the cooperative MIMO mode service from neighbor BSs operable as cooperative BSs. Also, the exemplary embodiment of the present invention described in FIG. 7 may be implemented without PMI restriction.

Figure 8:
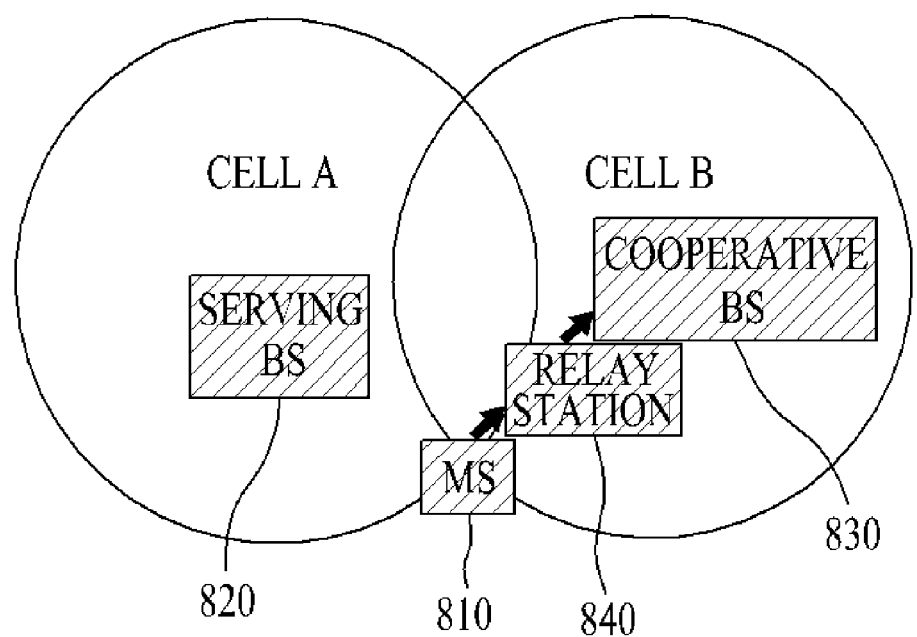
FIG. 8 illustrates a method for transmitting feedback control information in an MS according a further exemplary embodiment of the present invention.

FIG. 8 illustrates a method for transmitting feedback control information in an MS according a further exemplary embodiment of the present invention. Like the exemplary embodiment illustrated in FIG. 3, the exemplary embodiment illustrated in FIG. 8 is also about the cooperative MIMO mode in the codebook-based precoding closed-loop MIMO scheme.

Referring to FIG. 8, an MS 810 located in the overlap area between cell A managed by a serving BS 820 and cell B managed by a cooperative BS 830 may transmit feedback control information including a PMI for the cooperative BS 830 to the cooperative BS 830 through a relay station 840. In accordance with the exemplary embodiment of the present invention, the relay station 840 is an active repeater that cancels noise, corrects errors, and amplifies power for a signal received from the MS 810, not a passive repeater located in the middle between cells, simply for amplifying transmit power. As the active relay station, the relay station 840 may allocate channel resources so as to exchange feedback control information about a radio channel status or the like with the MS 810. Also, the relay station 840 may process a delay-sensitive feedback channel and, upon receipt of feedback control information through feedback channels simultaneously from a plurality of MSs, it may process the feedback control information according to their time order by a time alignment function.

To transmit feedback control information via an intended relay station, it is required that the MS has prepared for a call processing with the relay station. That is, the MS detects its current location by measuring the strengths of reference signals such as pilot signals, received from a serving BS, neighbor BSs, and an adjacent relay station. When it determines that it is located at a cell boundary and that the cooperative MIMO mode is required, the MS may transmit delay-sensitive feedback control information with an appropriate time delay only if it is allocated a feedback channel from the relay station and prepares for transmission of the feedback channel.

The method for transmitting feedback control information through a relay station according to the exemplary embodiment of the present invention illustrated in FIG. 8 may be implemented in conjunction with the exemplary embodiments illustrated in FIGS. 4 and 6. That is, feedback control information may be transmitted to the cooperative BS over a backbone or directly to the cooperative BS through a fast feedback dedicated channel allocated by the cooperative BS, depending on the delay sensitiveness of the feedback control information. When a feedback channel such as a fast feedback dedicated channel is not allocated from the cooperative BS, the feedback control information may be transmitted via the relay station.

Figure 9:
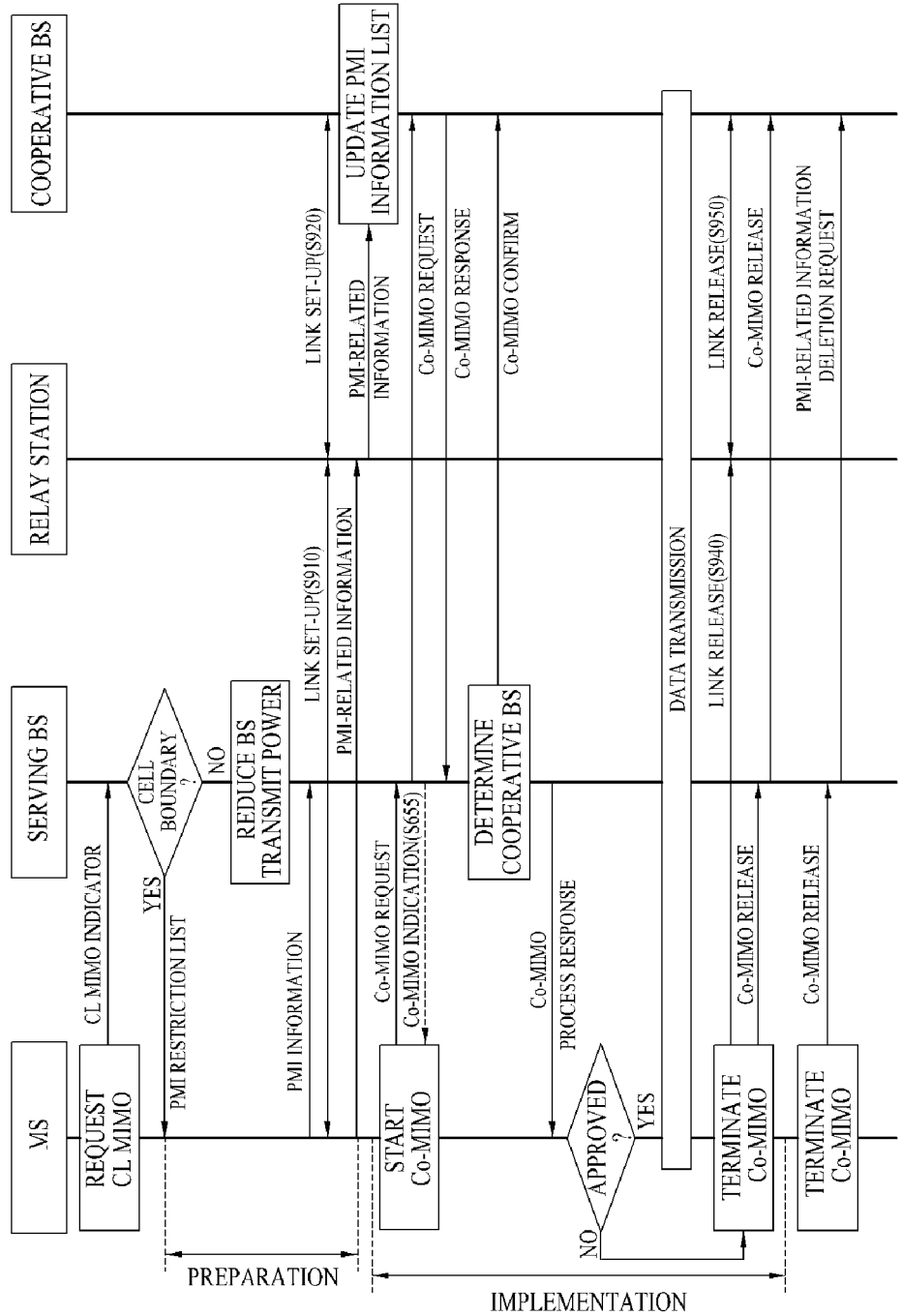
FIG. 9 is a diagram illustrating a signal flow for a closed-loop cooperative MIMO operation according to a further exemplary embodiment of the present invention.

FIG. 9 is a diagram illustrating a signal flow for a closed-loop cooperative MIMO mode operation according to a further exemplary embodiment of the present invention. The exemplary embodiment of the present invention illustrated in FIG. 9 is also about the cooperative MIMO mode in the codebook-based precoding closed-loop MIMO scheme, especially a case of PMI restriction. The signaling flow is identical to that illustrated in FIG. 5 on the whole, except that the feedback control information is transmitted directly to a neighbor BS to act as a cooperative BS via a relay station. As described before with reference to FIG. 8, the feedback control information is transmitted to a neighbor BS that may act as a cooperative BS via a relay station.

To this end, the link establish is required for transmitting and receiving via feedback channels between the MS and the relay station and between the relay station and the neighbor BS to act as a cooperative BS are to be established (steps S910 and S920) in the preparation stage and the established links are to be released when the cooperative MIMO mode is terminated in the cooperative MIMO mode implementation stage (step S940 between the MS and the relay station and step S950 between the relay station and the cooperative BS).

While signaling is carried out in the context of a single cooperative BS in the illustrated case of FIG. 9, the same signaling flow may apply to the case where the MS is located at the boundary between two or more neighbor BSs such that the MS receives the cooperative MIMO mode service from neighbor BSs operable as cooperative BSs. Also, the exemplary embodiment of the present invention described in FIG. 9 may be implemented without PMI restriction.

As described above regarding the method for transmitting feedback control information for cooperative MIMO from an MS to a collaborative BS according to the exemplary embodiments of the present invention illustrated in FIGS. 4 to 9, the MS may select one or more transmission paths or use a transmission path selected by the serving BS depending on the delay sensitiveness of the feedback control information, the presence or absence of a relay station, and whether the cooperative BS may allocate a feedback channel.

Hence, it may be contemplated as another exemplary embodiment of the present invention that the MS selects one or more transmission paths according to the above exemplary embodiments of the present invention depending on the delay sensitiveness of the feedback control information, the presence or absence of a relay station, and whether the cooperative BS may allocate a feedback channel and transmits the feedback control information on the selected one or more transmission paths. Or the serving BS may select a transmission path and notify to the MS of the selected transmission path, rather than the MS selects a transmission path.

In the exemplary embodiments of the present invention, a description is made of a communication procedure between a transmitter and a receiver. The transmitter may be an MS or a BS of a network, and the receiver may be the BS of the network or the MS. Terms used herein may be used interchangeably with other terms having the same meanings. For example, the term 'terminal' may be replaced with the term 'MS', 'mobile terminal', 'communication terminal', 'User Equipment (UE)', 'user device', etc. The term 'BS' may be replaced with the term 'fixed station', 'Node B (NB)', 'eNode B (eNB)', etc.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The method for transmitting and receiving data in cooperative multiple-input multiple-output mobile communication system according to the present invention is applicable industrially.

The invention claimed is:

1. A method for transmitting feedback control information at a mobile station (MS) in a wireless communication system using a cooperative Multiple-Input Multiple-Output (MIMO) mode, the method comprising:
   determining, by the mobile station, to transition to the cooperative MIMO mode;
   transmitting, by the mobile station, control information requesting the cooperative MIMO mode to a serving base station;
   receiving, by the mobile station from the serving station, Precoding codebook Matrix Index (PMI) information including PMI restriction lists for respective frequency bands allocated to the serving base station, when the MS is located at boundary of a cell managed by the serving base station,
   wherein the PMI restriction lists indicate available predetermined PMIs for the mobile station inside a cell of a neighbor base station;
   selecting, by the mobile station, a transmission path between the MS and one or more cooperative base station for transmitting precoding-related feedback control information to the one or more cooperative base stations operating in the cooperative MIMO mode, wherein the transmission path is at least one of a first path running through a serving base station, a second path running directly to the one or more cooperative base station, and a third path running via a relay station;
   transmitting, by the mobile station, the precoding-related feedback control information to the one or more cooperative base stations through the selected transmission path; and
   receiving, by the mobile station, data from the one or more cooperative base stations, to effect at least one of spatial diversity and spatial multiplexing
   wherein the precoding-related feedback control information is transmitted by using an orthogonal code specific to the one or more base station, when the precoding-related feedback control information is transmitted via the second path.

2. The method according to claim 1, wherein the precoding-related feedback control information includes at least one of cell Identifiers (IDs), allowed frequency bands, modulation schemes, coding schemes, and precoding codebook matrix index information.

3. The method according to claim 1, wherein the precoding-related feedback control information is transmitted through a feedback channel managed by the one or more cooperative base stations when the transmission path is the direct path running from the mobile station to the one or more cooperative base stations.

4. The method according to claim 3, wherein the feedback channel is a fast feedback dedicated channel.

* * * * *